June 19, 1962 A. J. FOX 3,039,911
PROCESS FOR THE PRODUCTION OF SHAPED PLASTIC ARTICLES
Filed Dec. 15, 1959
Fig. 1.
Fig. 2.
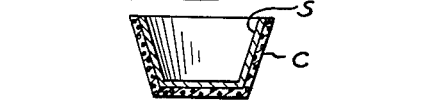
Fig. 3.
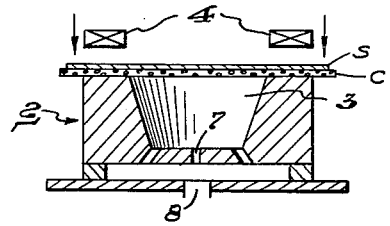
Fig. 4.
Fig. 5.
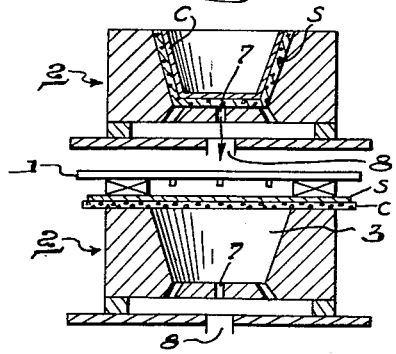
Fig. 6.
INVENTOR.
ALAN J. FOX.
BY Oscar B. Brumback
his ATTORNEY United States Patent Office 3,039,911
Patented June 19, 1962

3,039,911
PROCESS FOR THE PRODUCTION OF SHAPED PLASTIC ARTICLES
Alan J. Fox, Sewickely, Pa., assignor to Koppers Company Inc., a corporation of Delaware
Filed Dec. 15, 1959, Ser. No. 859,707
2 Claims. (Cl. 156—224)

This invention relates to a process for the production of shaped plastic articles, and more particularly, to a process for the production of shaped plastic articles having an interior skin or exterior skin or both of an organic plastic material, and a core of extruded polystyrene foam; and to the articles produced thereby.

Thermoforming is a basic method of shaping thermoplastic sheets. Vacuum forming, one type of thermoforming, consists of fastening a thermoplastic sheet on top of a mold; directing radiant heaters on this assembly until the sheet becomes soft and pliable; drawing a vacuum in the enclosed mold cavity whereby the sheet, in its elastic state, is pressed by the normal atmospheric pressure against the mold contours in the depressurized space, cooling the sheets for a short period, after which the sheet "sets" in the shape of the mold and can then be removed.

Many thermoplastic materials have been used to produce shaped articles by the thermoforming technique. These materials include high impact polystyrene, acrylonitrile-butadiene styrene, acrylic sheeting, vinyl sheeting, polyethylene sheeting, cellulose acetate and butyrate, etc.

Although the above thermoplastics, when thermoformed into shaped articles are useful as commercial items, such as containers for food and liquid, none of the shaped articles made therefrom contain the highly desirable combination of properties to be found in the final products made by the process of this invention. These properties of the novel product of this invention include rigidity, thermal insulation, high surface glaze and disposability after single use, without any relatively great economic loss.

Several methods for making containers have been employed to take advantage of the insulating qualities of polystyrene foam. In one such method, expandable polystyrene beads are placed in a cup shaped mold and heat is applied thereto, causing the expansion and fusion of the beads into the shape of the mold. The shaped thermoplastic article made in this manner has excellent insulating properties, but it has the disadvantage that the cellular or aerated structure of such foam occurs on the surface thereof, giving the article a rough, irregular surface. This cellular surface also permits seepage of any liquid contained therein when the liquid is allowed to remain in the article for any length of time. This article has another disadvantage in that the cellular structure imparts a weakness to the shaped article and whenever pressure is applied thereto, such as squeezing in the hand, the article will crack at the cell junctures.

Shaped articles made in accordance with the process of this invention, while retaining the desired insulating properties of heat expanded fused articles, overcome the deficiencies found in the foam containers described above.

Shaped articles to be used as containers for foodstuff or beverages have also heretofore been made by cutting and folding flat sheet stock into receptacle form, but this method has the disadvantage that any pretreating of the surface of the sheet, as by ordinary coating methods, prior to forming, tends to break or weaken the coating along the fold lines or creases during the forming operation. The folds and creases also tend to make the shaped articles susceptible to leakage from liquids contained therein.

I have found the foregoing disadvantages, that were present heretofore, can be overcome by the contacting of sheets of foam polystyrene film with a heated sheet of styrene polymer, whereby the two sheets adhere to yield a laminate, and forming a shaped article from said laminate. It is particularly advantageous to carry out the forming and lamination of a shaped article in one step, as by a single operation it is possible to produce a shaped laminated structure that is impervious to liquid and that has no crease or score lines. Further, this novel process has the advantage of utilizing conventional thermoforming apparatus to carry out the process.

The shaped articles produced in accordance with the process of this invention have excellent rigidity and strength characteristics. If desired, the article will contain liquids, such as beverages, for long periods of time without liquid permeation of the article. The articles produced by this invention have the desirable characteristic of a smooth glazed surface. In addition, the articles produced by the method of this invention have excellent thermal insulating properties. Most surprisingly, the articles can be produced with the present market value of the materials used at such low costs that the articles can be disposed of after a single use without any relatively substantial economic loss.

In one embodiment of the invention a sheet of polystyrene foam film and at least one sheet of styrene polymer is placed in a mold clamp and then heated to a temperature that will cause the adherence of one sheet to another, thereby forming a laminated structure which, in a pliable state, is contacted with a mold so that a vacuum is drawn under the laminated structure, whereby the structure conforms to the contour of the mold; the laminated structure is cooled and released from the mold as a formed article.

In the practice of this invention, the sheet of styrene polymer is a sheet advantageously having a thickness of .0005 in. x .0300 in. By styrene polymer is meant a homopolymer of styrene and monovinyl aromatic hydrocarbons or nuclear halogenated derivatives thereof as well as copolymers thereof containing a predominant proportion, preferably 80% by weight, of styrene or mono-vinyl aromatic hydrocarbons. Examples of monovinyl aromatic compounds which can be employed in making the polymers are styrene, vinyltoluene, vinylxylene, ethylvinylbenzene, ethylvinyltoluene, isopropyl styrene, tert.-butyl styrene, chlorostyrene, dichlorostyrene, fluorostyrene, or ar-chlorovinyltoluene. Copolymers containing at least 80% by weight of any one or more of such monovinyl aromatic compounds chemically combined with other monoethylenically unsaturated organic compounds such as alphamethyl styrene or methyl methacrylate can also be used. Other suitable polymers are copolymers of any one or more monovinyl aromatic compounds such as styrene, vinyltoluene, or fluorostyrene cross-linked with from 0.01 to 0.5 percent by weight of a divinyl aromatic compound, e.g. divinylbenzene, divinyltoluene or divinylethylbenzene. Also included are styrene polymers modified by the addition of as much as 15 percent by weight of natural or synthetic rubber. The sheet of polystyrene foam film may be made by the process described in copending application No. 780,934, A. R. Kudlach, filed December 17, 1958, which application is assigned to the assignee of this invention. Briefly stated, this film is a flexible foam polystyrene having a minimum thickness of .005 inch that can easily be bent through an arc of 180° C. without scoring. The average cell size of these foams is about .002 inch and the average cell wall thickness about .0004 inch. The density of the material varies from .75 pounds per cubic foot to about 8 pounds per cubic foot. An outstanding example of this film is manufactured by Koppers Company, Inc., and is produced from beads of expandable polystyrene such as are sold under the name Dylite.

For purposes of this invention, the polystyrene foam film described above will be referred to as the core. The laminating skins to be applied to the core may be of any of the styrene polymers or they may be of polystyrene foam film of the same type as the core. It should be understood that the choice of layer will depend upon the desired appearance and properties of the final product.

For vacuum thermoforming, one or more thermoplastic sheets of a styrene polymer in combination with the core may be inserted into a commercial vacuum forming machine of the type manufactured by Auto-Vac Company, Bridgeport, Connecticut, and designated as model EQA. The radiant heaters of the machine are heated to a temperature, usually about 600–1100° F., that will cause the inserted sheets to adhere to one another, forming a laminate.

In the preferred manner of practicing the present invention, the sheets which are to be used as the core and exterior or interior skins are heated to a temperature in which they are pliable, but not to a temperature in which they can flow freely. The core is heated so that it will be easily drawn down into the mold by the vacuum; and in the case of the exterior or interior skins, the heating to a pliable state is required in order to fuse the surface of the interior or exterior skins to the core. It has been found that if the covering thermoplastic skin is heated to a point at which it becomes free flowing the contiguity of the covering skin will be destroyed, that is, holes will appear on the surface and as a result the exterior and interior skins will not produce an impervious skin over the thermoplastic foam to which it is applied.

The thus-laminated sheet which, due to applied heat, is in a pliable state, is then brought into contact with the desired shaped mold and a vacuum is drawn under the sheet so that the sheet will conform to the size and shape of the mold.

The mold and the article within are cooled and the article so molded is released, retaining the shape of the selected mold.

An important requirement of the procedure consists in maintaining complete adhesion of the coating to the core at all points where it comes in facial contact therewith prior to drawing the laminated structure into the mold with the vacuum. This contact is necessary so that the sheets can be simultaneously drawn into the mold without having air space between. The air space would, of course, cause an imperfectly laminated structure to be produced.

There is no theoretical limitation to the thickness of the covering skin or skins. However, the practical limitation which would make this invention efficient and inexpensive and make the skin more readily applicable to the core would indicate that the covering skins be as thin as possible without destroying their impermeability.

If it is desired to make the finished article contemplated by this invention more attractive the polystyrene foam film used as the core may be dyed in any well known manner. Thus when the dyed core is laminated with a clear polystyrene film and vacuum formed, the article produced has a smooth, glazed, transparent surface which permits the color of the core to be visible and therefore aesthetically desirable.

To effectually unite the skin or skins and the core, according to this invention, to form a unitary structure, wherein the parts are substantially permanently adhered to one another, it is necessary to bring the surface of the core and the skin to a temperature sufficiently high to fuse or soften such materials but not so high as to disintegrate or make them free flowing during the operation of vacuum thermoforming.

Features of the invention other than those specified will be apparent from the following detailed description and claims when read in conjunction with the accompanying drawings, wherein:

FIGURE 1 shows a piece of flat sheet polystyrene to be applied to the polystyrene foam of FIGURE 2.

FIGURE 2 shows the cross section through an illustrative type of polystyrene foam film to which the covering skin or skins are to be applied.

FIGURE 3 shows a finished molded article in cross section with the skin applied thereto.

FIGURE 4 shows the cross section of a female mold with the sheets of FIGURES 1 and 2 clamped thereon prior to heating.

FIGURE 5 shows the laminated pliable article in the female mold. As shown, the laminated sheet fills the entire mold and is held there by vacuum applied through the openings in the mold surface.

FIGURE 6 shows the mold and the radiant heater positioned above the mold.

According to this invention, the thermoplastic skin may be made to cover either or both surfaces of the thermoformed container or article.

For the purposes of illustration, I shall describe the method of applying such a sheet to the upper surface of the core which upon vacuum forming will serve as an interior lining of the finished article. It should be understood, however, that the same procedure could be used to apply a sheet to the lower surface of the core or to apply two sheets simultaneously, one to the lower surface and one to the upper surface.

The sheet illustrated in FIGURE 1 and indicated by reference S is a sheet of normal polystyrene which was extruded in the form of a transparent plastic sheet having a density of 63 pounds per cubic foot and a thickness of .01 inch.

It is necessary to use a sheet C as the core of the article to be molded by vacuum forming. Sheet C is a sheet of expanded polystyrene foam having a density of 8 pounds per cubic foot and a thickness of .08 inch. This produces in the finally molded article good thermal insulation, making the molded article suitable as a container for hot liquids.

To compound sheet S of FIGURE 1 and core C of FIGURE 2 according to the invention so that the parts will adhere to each other it is necessary to bring the surface temperatures of core C and sheet S sufficiently high to fuse and soften the core and sheet but not so high as to cause them to be free-flowing. This heating takes place after the two sheets are clamped into position as illustrated in FIGURE 4. Clamping frame 4 holds the sheets in position over mold 6. The heating of the two clamped sheets C, S may now be accomplished. This heating is accomplished by utilizing the heater 1 of FIGURE 6. Through the employment of such appropriate heating means the clamped sheets C, S may be brought to and maintained at an optimum temperature which temperature will manifestly depend upon the particular plastic of which the laminated structure is to be composed. For the sheets of FIGURE 4 the heater temperature was 600° F. at which temperature the sheets adhered to one another and became pliable and soft preparatory to being formed to a desired shape.

The forming of the laminated structure to a shaped article takes place in a mold 2 as illustrated in FIGURE 6. The mold may be of any shape. In FIGURE 6 the mold is in the shape of a cup. The mold structure has an interior chamber 3. From the chamber 3 passages lead to the exterior of the bottom of the mold so that vacuum may be drawn under the sheet to be formed. A vacuum connection is provided by pipe 8. As vacuum is drawn under the laminated sheet of FIGURE 6 the sheet begins to take the shape of the mold. Once the sheet conforms to the interior contours of the mold, the so-formed sheet is cooled and released from the mold as a formed article as shown in FIGURE 3.

The type of equipment which may be used in this operation is not necessarily limited to that which has been hereinbefore described. Any thermoplastic sheet forming technique, such as drape-forming, plug-assist forming, drape-assist forming, air slip forming, vacuum pressure forming, plug-and-ring forming, pressure forming may be used to produce the articles contemplated by this invention.

Although the above illustration of this invention described the lamination and vacuum forming of a normal polystyrene in combination with a polystyrene foam sheet, other polystyrenes may be used in combination with the polystyrene foam sheets. Illustrative polystyrenes include, but are not limited to: rubber modified polystyrenes, copolymers of polystyrene, and polystyrene foam films.

The hereinbefore detailed operation describes the preferred embodiment of the process of this invention. The process is not necessarily limited to lamination of the sheets as described, but obviously includes the process whereby the sheet of polystyrene foam and a heated sheet of polystyrene are pressure contacted to cause adherence of one to the other, and then subsequently formed while still in a pliable condition because of the heating, or are cooled and later formed by conventional heating and forming operations.

I claim:

1. A process for concurrently laminating and forming by a single operation in the absence of an adhesive, a rigid, water impermeable, thermal insulating, container-shaped article which comprises: applying at least one continuous sheet of styrene polymer to a continuous extruded foamed polystyrene film in facially contacting relationship therewith, holding them in said contacting relationship over a mold cavity and heating them to a temperature above the fusion temperature of said contacting surfaces but below the temperature at which said styrene polymer becomes free flowing for a sufficient period of time to permit the heat to effectually unite the sheet of styrene polymer to the film of foamed polystyrene to thereby form a laminate; conforming said fused laminate to the contours of said mold; then cooling the mold; and then removing the article therefrom.

2. A process for concurrently laminating and forming in the absence of an adhesive rigid, water impermeable, thermal insulating, container-shaped articles which comprise: applying at least one continuous sheet of a styrene polymer having a thickness of .0005 inch to .0300 inch and containing 80% by weight of styrene to a continuous extruded foamed polystyrene film having a thickness of at least .01 inch and a density of from 0.75 pound per cubic foot to about 8 pounds per cubic foot in facially contacting relationship therewith, holding said sheets in said contacting relationship over the area of a molding cavity, heating them to a temperature of between 600 and 1100° F. to permit said heat to effectually unite said sheets without destroying the contiguity of said sheet of styrene polymer to thereby form a laminate; conforming said laminate to the contours of said mold by drawing a vacuum thereunder; removing the heating means and retaining said laminate in said mold until cooled, and then removing the article therefrom.

References Cited in the file of this patent

UNITED STATES PATENTS

| 2,806,812 | Merz | Sept. 17, 1957 |
| 2,893,877 | Nickolls | July 7, 1959 |
| 2,978,376 | Hulse | Apr. 4, 1961 |

FOREIGN PATENTS

| 805,236 | Great Britain | Dec. 3, 1958 |

OTHER REFERENCES

"Vacuum Forming Equipment and Methods," Modern Plastics, May 1954, pages 90–91.